June 5, 1928.

J. H. STRINGHAM ET AL 1,672,286

METHOD OF AND APPARATUS FOR DISHWASHING

Filed July 5, 1924 7 Sheets-Sheet 4

INVENTORS
John H. Stringham,
Edgeworth Greene,
Whitstill H. Swenarton

BY Whitstill H. Swenarton
Their ATTORNEY.

June 5, 1928.  
J. H. STRINGHAM ET AL  
1,672,286  
METHOD OF AND APPARATUS FOR DISHWASHING  
Filed July 5, 1924  7 Sheets-Sheet 6

INVENTORS  
BY  
Their ATTORNEY

June 5, 1928.  1,672,286
J. H. STRINGHAM ET AL
METHOD OF AND APPARATUS FOR DISHWASHING
Filed July 5, 1924   7 Sheets-Sheet 7

Inventors:
John H. Stringham,
Elsworth Greene,
Waitstill H. Swenarton
By their Attorney Patented June 5, 1928.

1,672,286

UNITED STATES PATENT OFFICE.

JOHN H. STRINGHAM, OF JERSEY CITY, AND EDGEWORTH GREENE AND WAITSTILL H. SWENARTON, OF MONTCLAIR, NEW JERSEY, ASSIGNORS, BY DIRECT AND MESNE ASSIGNMENTS, OF ONE-THIRD TO SAID GREENE, ONE-THIRD TO SAID SWENARTON, AND ONE-THIRD TO HAROLD L. TUNISON, OF STAMFORD, CONNECTICUT.

METHOD OF AND APPARATUS FOR DISHWASHING.

Application filed July 5, 1924. Serial No. 724,360.

This invention relates to dish washing machines of the type wherein the objects to be washed are successively subjected to a deluge of soapy water in the form of a spray and has for its particular objects the production of a durable effective and economical machine which is simple to operate, requires but a small pump unit and consequently but a minimum quantity of hot water, and withal is virtually self-cleansing and from which collected débris can be conveniently removed without necessitating removal of the objects being washed.

The invention is set forth in detail in the following description and drawings forming a part thereof in which latter

Referring to the drawings and the construction shown therein, 1 designates a tank of heavy gauge copper, enameled iron or other suitable material of sufficient size to give the desired capacity. The bottom 2 of said tank is preferably elevated, in the form of a false bottom above the lower end of the side walls of said tank so as to leave an apron which conceals and serves as a support for a hoop 3 to which is secured a tripod frame 4 provided with casters 5 on the lower ends of the vertical legs thereof.

A bed plate member 6 serves as a support for an electric motor 7, the armature shaft 8 of which is slidably keyed by a key 9 to an aligned slotted shaft of a worm 10 which is rigidly keyed at its opposite end 11 by means of key 12 to an aligned rotor shaft 13 of an eccentric gear rotary pump 14 which latter is provided with inlet and outlet conduits 15 and 16 respectively. Said worm 10 is adapted to engage with and drive gear 17 keyed on a counter-shaft 18 carrying the pinion 19, which latter in turn engages with a main driven gear 20 keyed to shaft 21. Both the counter-shaft 18 and shaft 21 are mounted in ball thrust bearings provided in a casting 22, which latter is bolted to the frame 4 as shown. Each of said shafts is provided at a point adjacent the upper end of the bearings thereof with an annular groove 23 which is adapted to receive the inner end of a set-screw 24 threaded into an aperture 24′, which serves to retain the said shafts in their respective bearings in the event the machine is turned over in shipment or for repair purposes.

Figures 7, 8, 9, 9A, 10, 11:
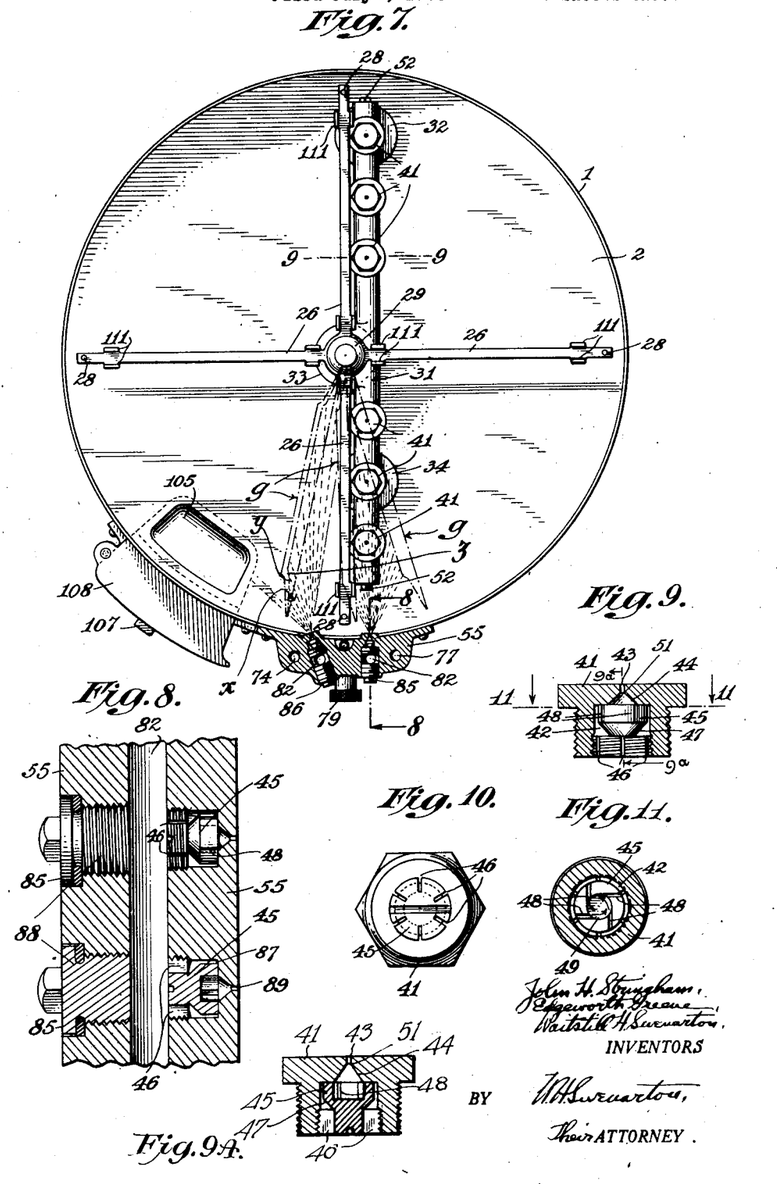
Fig. 7 is a horizontal section on the line 7—7 of Fig. 1.
Fig. 8 is an enlarged vertical section on the line 8—8 of Fig. 7 showing the construction of the lateral spray nozzles.
Fig. 9 is a vertical section on the line 9—9 of Fig. 7 showing the construction of a bottom spray nozzle isolated and Fig. 9ᵃ is a vertical section on the line 9ᵃ—9ᵃ of Fig. 9.
Fig. 10 is a bottom plan view of the nozzle shown in Fig. 9
Fig. 11 is a horizontal section on the line 11—11 of Fig. 9.
Figure 12:
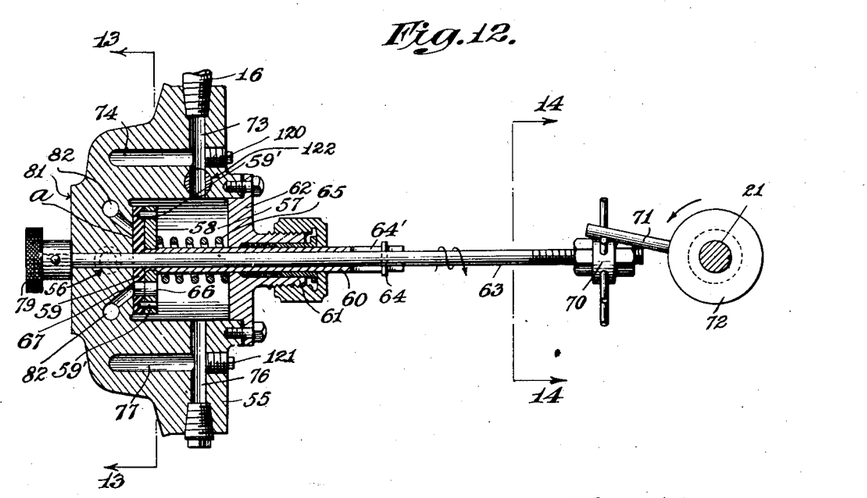
Fig. 12 is an enlarged horizontal section on the line 12—12 of Fig. 2.

On the upper end of the driven shaft 21 is mounted a spider member 26, the same being secured thereto by means of a set-screw 27 which preferably is screwed down sufficiently tight to insure that normally said shaft will rotate with the spider, except that in the event the spider becomes jammed, the shaft may continue to rotate independently therein, thus protecting the gears of the machine. Pins 28 are provided at the outer ends of the respective arms of said spider which serve to prevent the lateral displacement of the dish carrying baskets hereinafter described. As shown, the lower end of the hub of the spider member is formed into an apron 29 which is adapted to envelope the sleeve 30, which latter is integral with a tubular casting 31 that is provided with apertured bosses 32, 33 and 34 into which are adapted to be threaded nuts or plug members 35, 36 and 37 which serve in co-operation with the gaskets 38 to secure said casting to the tank and to make a leak-tight joint therewith. The nut 37 is provided with a central bore or conduit 39 which communicates with the bore or conduit 40 of said casting member 31. A series of centrifugal spray nozzles are threaded into the upper side of said casting and are adapted to communicate with and be supplied with water from the bore or conduit 40 thereof. Said centrifugal nozzles (Figs. 9–11) comprise an externally and internally threaded hollow plug member 41 provided with a central chamber 42 and a terminal aperture 43 which, as shown, is inwardly flared so as to form a conical recess 44. A supplemental plug or insert member 45, the outer wall of which is threaded at one end is adapted to be inserted within the recess 42 and the adjustment thereof is effected by screwing the same in or out of the recess to the desired extent. The periphery of the insert plug 45 at its outer end is provided with vertical slots 46 in order to afford communication between the rear of said plug and the chamber 42 when said plug is in its proper position in said chamber. The plug 45 immediately above the threaded portion, is reduced to form a conical face 47, which face serves to outwardly divert or deflect water entering through said slots 46. The water then passes through tangential slots 48 into the central chamber 49 of the plug 45 and then passes outwardly through the terminal aperture of the hollow conical tip 51 thereof. The tip 51 is rotatable for adjusting it toward or from the aperture 43 in plug 41, with which latter aperture 43 the aperture in 51 is adapted to register.

Closure plugs 52 permit of cleansing of the bore 40 of casting 31 when desired. A conduit 53 is provided on its outer end with the union 54 by means of which it is connected to the bottom of a casting 55. The bore of said conduit is adapted to communicate with a channel or passage 56 provided in said casting 55, and the terminal port of said passage 56 is in the finished face $a$ of the side wall of a pressure chamber 57. A metal disc 58, having a hard rubber disc 59 secured thereto by pins 59', is rigidly secured to a sleeve 60 which is mounted in a stuffing box 61 of the removable cover 62 of the chamber 57. Within the sleeve 60 is mounted a rod 63 which is slidably connected to said sleeve by a pin 64 that is adapted to travel in slot 64' and serves to admit of said rod moving longitudinally with respect thereto. The disc 59 serves as a relatively soft face for the metal disc 58 thereby constituting one element of a valve, the others of which are the finished face $a$ of chamber 57 aforesaid and coil spring 65 which serves to normally press said disc 59 against the said finished face $a$. The said discs 58 and 59 are respectively provided with arcuate registering slots 66 and 67 respectively, which are adapted to register selectively with terminal port $b$ of conduit 56 or ports $c$ and $d$ of conduits hereinafter described.

The said disc 59 is adapted to be rotated one-sixth of a revolution by the engagement with and movement of each spoke of the sprocket wheel 70, which is rigidly secured at one end of the rod 63, with the rotating arm or pin 71 which is carried by a collar 72 keyed to the main driven shaft 21. The length of the arcuate slots in said discs 58 and 59 is such that upon each two sixths turns of the sprocket wheel, in response to the successive engagement of the rotating pin 71 with two adjacent spokes of said sprocket as a result of two complete rotations of the driven shaft 21, a different port will be brought into registry with the arcuate slots and consequently into communication with the chamber 57. Furthermore, said arcuate slots are of just sufficient length to prevent the closure of any portion of one of the ports $b$, $c$, or $d$ unless a complementary portion of the next contiguous port is brought into registry with such slot and accordingly, it will be impossible for the water in the system to become dammed up during the step by step operation of the selective valve mechanism, since said slots 66 and 67 will conjointly serve to by-pass part of the water through the next successive port which communicates with another group of nozzles during the transition period when one port is being covered and the next port uncovered and thus at least the maximum amount of water which can flow through any single port when the same is in full registry with such slot can be discharged to the chamber at all times during the period that the water is supplied thereto through the discharge conduit from the pump. The casting 55 is provided with a conduit 73 at one side of the chamber 57 which connects directly with the aforesaid discharge outlet 16 of the pump and with a vertical discharge conduit 74 that is provided with a cut-off at its upper end controlled by a swinging discharge pipe 75. At the other side of said chamber 57 there is provided a conduit 76 which is in communication therewith and also with a vertical fresh or rinse water supply conduit 77 that also is provided with a cut-off valve at its upper end which is controlled by a swinging intake pipe 78, which valve is similar to that between conduit 74 and pipe 75.

An adjusting device, comprising a knurled knob 79 rigidly secured to the rod 63 and a pointer 80 carried thereby which is adapted to travel over a graduated dial 81, serve to permit of the manual control of the supply of water. This is accomplished merely by retracting the rod 63 so as to withdraw the sprocket 70 from the path of the rotating pin 71 and then turning the knob 79 until the pointer 80 is in the position corresponding to the particular series of nozzles which it is desired to operate, whereupon water will be supplied only to that particular series of nozzles until such time as the sprocket is returned into the path of the pin 71.

The ports c and d comprise the lower terminals of the feed supply conduits 82, the former being in communication with two groups of centrifugal nozzles 84 and 85, and the latter d with a single group 86. Each of these nozzles is essentially similar in construction to the bottom or horizontal nozzles previously described, except that the supplemental plug member is mounted in a chamber formed in the inner wall of the casting 55 in lieu of being mounted in a plug member such as 41 and a closure plug 88 is provided which permits of removal of said supplemental plug 45, as well as of direct access thereto and to the chamber 87 and the terminal aperture 89 when desired for either cleaning thereof or regulation of the spray issuing from such apertures.

The alignment of the upper series of nozzles 85 is such that the axes of the sprays issuing therefrom will coincide substantially with the radii of the tank, and as a consequence the rear of each dish carried by the upper trays will be most effectively deluged and washed. The lower nozzles 84 are disposed in such a manner that the axis of the spray issuing from the upper one of such series will be substantially parallel to the axis of the spray issuing from one of the nozzles 86, whereas the axis of the spray issuing from the middle of a nozzle of the series 84 will about coincide with the radius of the tank, and the axis of a spray issuing from the lower nozzle of such series will extend the same distance to one side of the radius of the tank as does the axis of the upper spray of such series extend to the other side.

Figure 1:
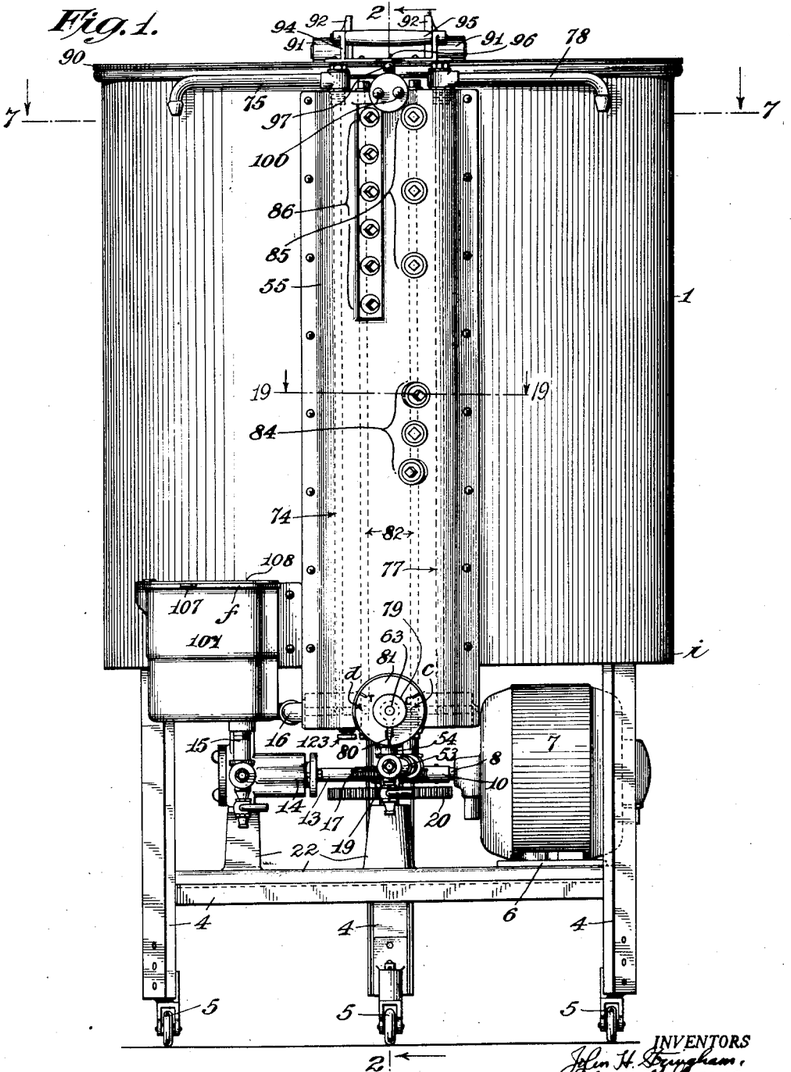
Figure 1 is a front elevation and Fig. 2 a vertical section of a dishwashing machine embodying our invention in its preferred form showing a few dishes positioned therein.
Figure 2:
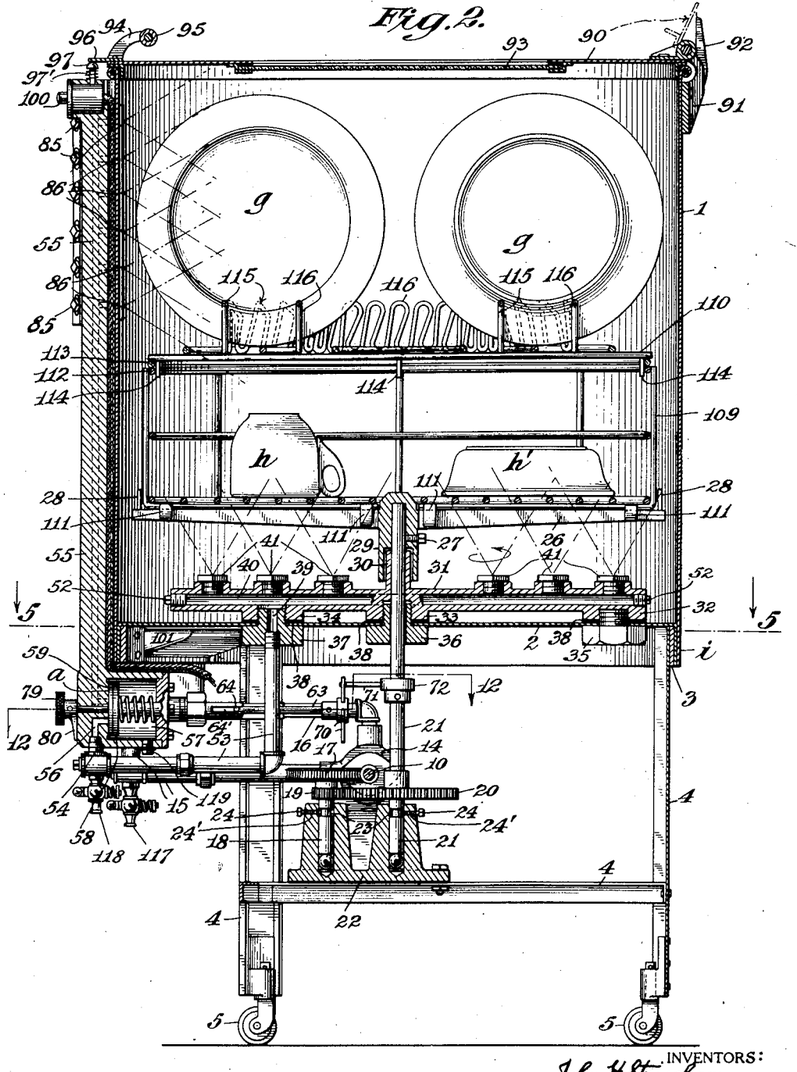

The cover 90 is hinged to a casting 91 that is riveted to the side of the tank 1 and a stop arm 92 preferably integral with said casting, serves to limit the extent to which cover may be opened as shown in dotted lines Fig. 2. Said cover is preferably provided with a glass window 93 which permits of the observation of the washing operation.

Figure 4:
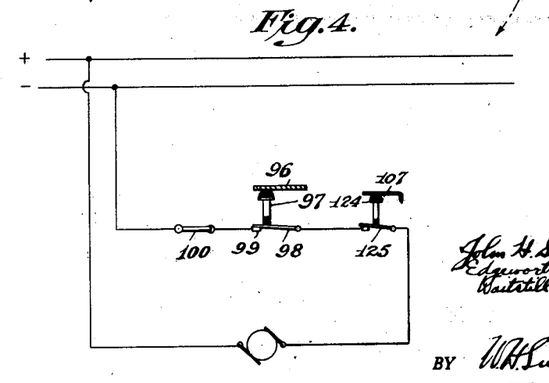
Fig. 4 is a wiring diagram of the circuit controlling the operation of the electric motor element.
Figure 5:
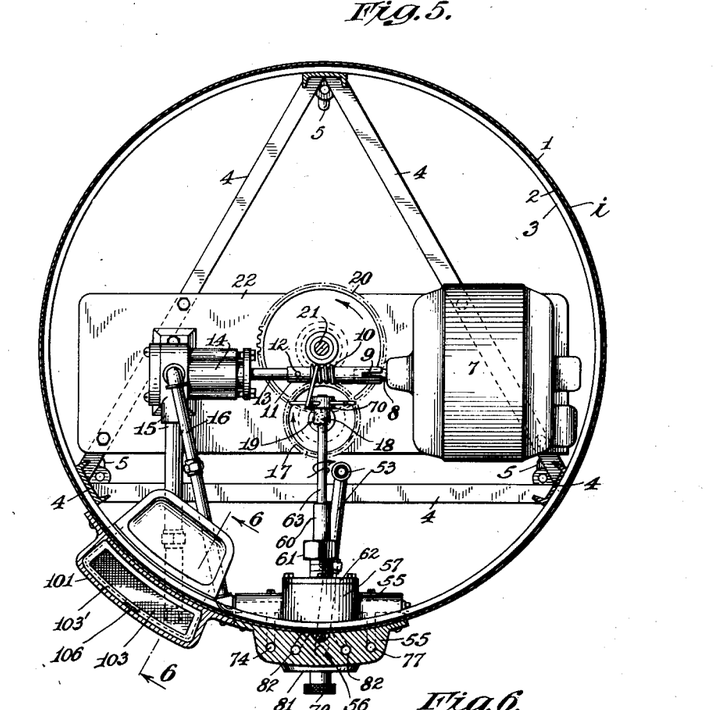
Fig. 5 is a horizontal section on the line 5—5 of Fig. 2.

At the opposite side of the cover from said hinge is a casting 94 which is provided with a handle or grip member 95 and a projecting horizontal flange 96. The latter is adapted when the cover is closed to depress an auxiliary push-button 97 which thereby automatically makes contact between the switch 98 and contact 99 in an electric circuit controlling the operation of the motor. (See Fig. 4). Manually controlled main push-buttons 100 serve to close the circuit at such times only as the cover of the machine is closed and terminals 98 and 99 are in contact.

At the bottom of the machine and in a position to be readily accessible to the operator, is a casting 101 which is formed to provide a well or sump chamber 102 adapted to receive a removable strainer basket 103 provided with a peripheral flange 103' adapted to rest on a shoulder e formed in the casting. Said sump is in communication through an inclined conduit with the interior of tank 1 through the opening 105 therein, and also is of sufficient height to extend above the water level of the machine which is determined by the quantity of water introduced and readily observable in the sump chamber. The strainer or sieve basket is provided with a handle 106, and a grip 107 is adapted to project beneath a removable cover 108 and rest on the upper lip f of the casting thus permitting of the convenient removal of said basket 103.

The dish carrying members comprise two skeleton wire baskets 109 and 110, the lower basket 109 being adapted to set within the limits of the stop pins 28 on the ends of the spider arms which latter is provided with a series of clamping members 111 adapted to grip the crosswires of the basket and insure the rotation of the basket therewith. At the uper end of the lower basket is a wire rim 112 upon which a similar ring 113 of the upper basket is adapted to rest. Said upper basket is provided with downwardly projecting positioning pins 114 which are adapted to project within the limits of the rim 112 of the lower basket when the two baskets are properly placed in the machine.

The upper basket is provided with a dish rack member rigidly secured to the bottom thereof adapted to hold plates g, saucers or other flat dishes capable of being held thereby in an edgewise position which is the most advantageous position for the effective washing and rinsing thereof. Such rack member comprises two convoluted wires 115 and 116 which are concentrically disposed with respect to each other, each having a like number of convolutions or folds, but the inner folds of the inner wire being of a different shape or angularity than those of the outer to compensate for the greater length of the outer wire with respect to the inner one. As shown in Fig. 2 the lower basket is adapted to hold the cups h or deep dishes h' which are inverted thereon. The convolutions or folds of each of said racks 115 and 116 are such that the dishes held therein will, as they attain the position of the dish illustrated at the left in Fig. 7, be presented to the conical sprays issuing from the series of nozzles 86 at substantially an angle of incidence between the axes of said sprays and the plane of the dish of about 30 degrees, as indicated by the arc "x" in Fig. 7.

In order to drain the system and prevent the possibility of the residual water becoming stagnant we also provide drain cocks 117, 118 and 119 for the pump conduit 15, the lower nozzles conduit 53, and the pressure chamber 57 respectively, at substantially the lowest part of the system, and thereby when the machine is to be allowed to remain idle for several days or more, practically all residual water not discharged through the discharge pipe 74 by the operation of the pump can be removed.

In many cases it may be desired to permanently connect the fresh water inlet to the house plumbing system, and in such cases connections can be made between the waste pipe of the plumbing system and the outlet 74 by removing plug 120, and also between the hot water supply of the plumbing system and the inlet 77 by removing plug 121. In such cases the arms 75 and 78 are moved into the position shown by the tips of the arrows in Fig. 3.

Figure 3:
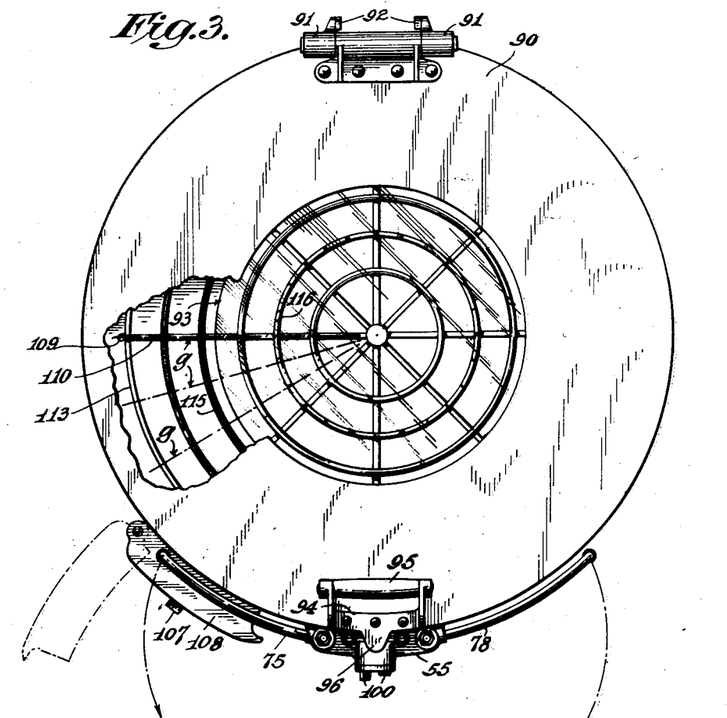
Fig. 3 is a top plan view partially broken away of the same machine.

We preferably rely upon the pressure of the fresh water supply of the house to counter-balance or substantially counterbalance the pressure developed by the pump 14 during the rinsing operation, whereby while the pump is still in operation the arm 75 can be swung into a discharge position, as indicated by the dotted lines in Fig. 3, and rinse water admitted to the arm 78 when the same is swung into an intake position as indicated by the dotted lines in Fig. 3, under which conditions the water discharged from the pump will pass from the discharge conduit 16 directly through conduit 74 into and out through arm 75, while the fresh rinse water will enter arm 78 into conduit 77 and the pressure chamber 57, whence it will pass into the nozzle supply conduits 82 and 53 depending on the position of the parts of the selective valve. Obviously, to prevent any of the dirty water from entering the spray system, the pump pressure must be sufficiently overbalanced to force a portion of the rinse water out through 74, also.

It may be desired by certain users that positive cut-off means be interposed between the discharge end of the pump and the pressure chamber 57, and accordingly for such purposes a valve 122, having handle 123, is provided so that when the same is closed all communication between the pressure chamber 57 and the discharge conduit 74 is cut off and the latter is only in communication with the outlet pipe 75.

In order to insure that the machine cannot be operated unless the strainer 103 is in its proper position in the sump chamber 102 and thereby preclude the clogging of the nozzles, the pump chamber, the pressure chamber or other passages of the machine, we have also provided an auxiliary push button circuit control 124 in the motor circuit. This control is identical in function and operation with the push button 97, except that the horizontal grip member 107 of the handle 106 when the basket is in proper position and the cover 108 is closed serves to depress the push button 124 which normally, due to the action of the spring 124', maintains the motor circuit open. Obviously the closing of the cover 108 would not suffice to close the portion of the circuit controlled by the push button 124 which operates a switch 125 and consequently the inadvertent omission of the strainer basket will prevent the operation of the machine.

Figure 6:
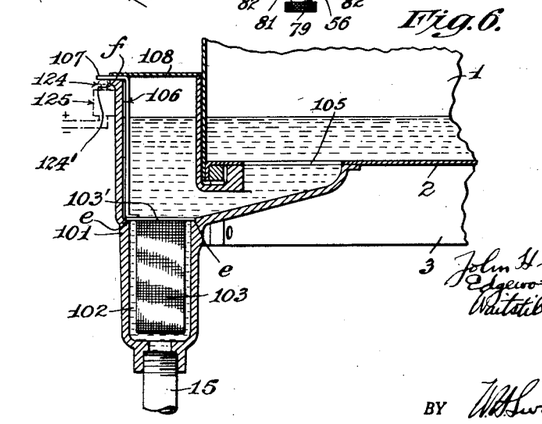
Fig. 6 is a fragmentary vertical section on the line 6—6 of Fig. 5 showing the construction of the sump element and the location of strainer basket therein.

Our improved dishwashing method which may be performed in the mechanism herein described or in other mechanism provided with manually operated cut-off valves in lieu of the automatic selective valve mechanism herein described is as follows:

Sufficient hot water is introduced through the intake conduit 78, or by directly pouring the same into the tank 1, to seal the suction side of the pump 15 at all times throughout the actual period of circulation of the water over the dishes,—for example, such a quantity as indicated in Fig. 6. When introducing the water of course the arm 78 is swung into the dotted line position shown in Fig. 3, so as to open its communication with conduit 77, and a rigid or flexible connection is made between the house faucet and the outer end of said arm 78. The arm 75 on the contrary is moved into its closed position as shown in Fig. 3, and kept in that position until it is desired to discharge the water into the sink or waste pipe. Of course the drain cocks 117, 118 and 119 are closed during the entire filling and washing operation.

The cups, bowls, glasses, sauce pans and other deep dishes or receptacles are placed in an inverted position on the bottom basket, which latter is then positioned in the machine as indicated on Fig. 2, and then the upper basket loaded with its quota of dinner plates, soup plates, saucers, platters and other relatively flat or shallow dishes held edgewise in the racks 115 and 116.

When the lower basket is in its proper position its lower crosswires will rest within the clamps 111, and the entire basket will fit within the limits of the pins or stops 28. The upper basket similarly will rest on the lower basket so that positioning pins 114 will project within the peripheral wire 112 of the lower basket.

The height of the lower basket above the nozzles 41 should be above the level of the intersection of the sprays with each other, and it will be noted in Fig. 2 that this level substantially coincides with the bottom of the spider arm, and thereby substantially a continuous spray extends across and will impinge upon all cups, saucers, or other dishes or pans placed upon the lower basket.

The pressure is preferably the maximum which will just fall short of dislodging inverted delicate cups or glasses placed on the lower tray, and such pressure we have found in a machine of the general proportions herein indicated when employing nozzles of the type shown, the outlet orifice of which corresponds to a No. 55 drill, can be maintained at about 35 to 40 lbs., and thereby excellent washing results can be secured. Obviously it will be impossible with a small pump of the type herein employed, the capacity of which is but about 3 gallons per minute, to maintain a pressure of 35 to 40 pounds on all of the 18 nozzles of the machine simultaneously, and for this reason the selective valve mechanism has proved to be most important.

Figure 13:
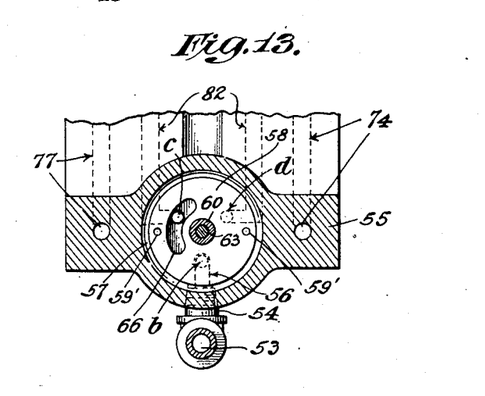
Fig. 13 is a vertical section on the line 13—13 of Fig. 12.
Figure 14:
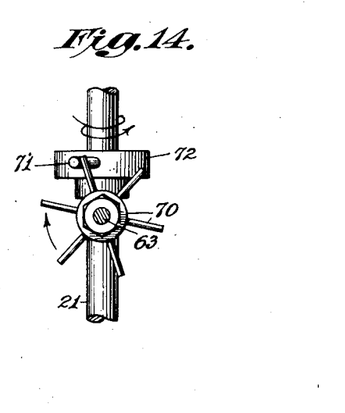
Fig. 14 is a section on the line 14—14 of Fig. 12.
Figure 15:
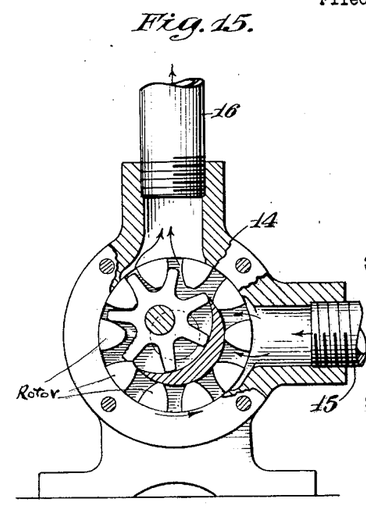
Fig. 15 is an end elevation partly in section of the rotary pump employed, the end plate thereof being removed.
Figure 16:
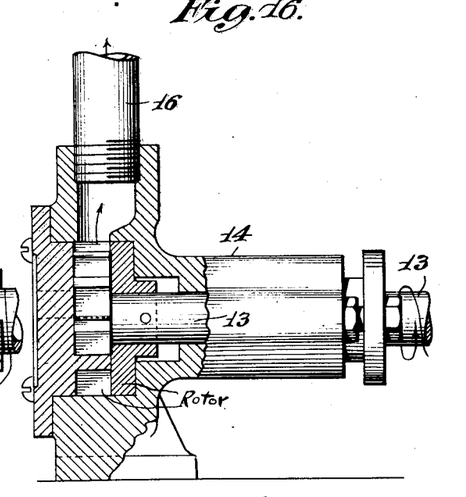
Fig. 16 is a side elevation partly in section of the construction shown in Fig. 15.
Figure 17:
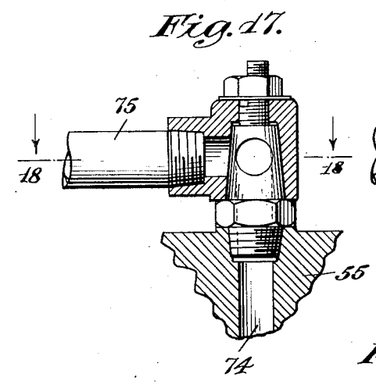
Fig. 17 is a section partly in elevation of the switch valve showing the valve controlling the flow of water through the switch arm 75.
Figure 18:
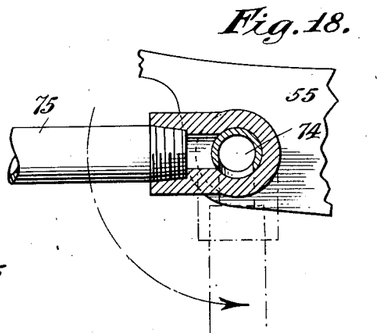
Fig. 18 is a section on the line 18—18 of Fig. 17
Figure 19:
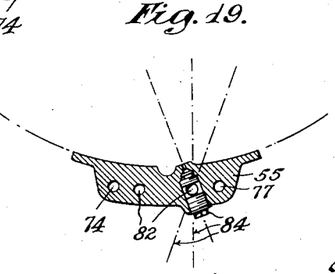
Fig. 19 is a fragmentary section on the line 19—19 of Fig. 1 showing the direction of the respective sprays issuing from the nozzles from group 84.

The dishes having been positioned within the machine, and the strainer basket 103 having been positioned within the sump chamber 102, so that the annular flange or lip 103' at the top of such basket rests on the shoulder "e" of the sump 101, in which position when the cover 108 of the sump is closed the pushbutton 124 will be depressed so as to close the switch 125, the cover 90 of the machine is closed, and this will automatically depress the normally elevated button 97 and close switch 98. The motor is started by closing the circuit of the motor which has already been partially closed through the closure of the switch members 125 and 98 by pushing one of the pushbuttons 100, which closes the main switch, and then if the rod 63 has been moved so that the sprocket 70 will lie in the path of rotation of the arm 71 the selective spraying of the dishes will occur. For example, when the slot 66 is in a position to uncover the port "c" of one of the conduits 82 which supplies the series of nozzles 86, the water will be circulated by the pump repeatedly from the pump through the pressure chamber, through such nozzles, thence to the sump and back to the pump. The spray from such nozzles will be discharged as indicated in dotted lines in Fig. 7. As the sprocket wheel is revolved step by step by pin 71, the disc 58 will move in the direction indicated by the arrow in Fig. 13, and the next port "d" of the conduit 82 which supplies the series of nozzles 84 and 85 will become uncovered and water will then be circulated by the pump repeatedly from the pump through the pressure chamber, through such nozzles, thence to the sump back to the pump.

As the step by step movement of the disc 58 continues the slot 66 will uncover the port "b" at the end of the conduit 53, and the pump will then circulate water from the pump to the pressure chamber 57, thence through the lower spray nozzles 41, through the sump and back to the pump. The selective spraying of the dishes is continued until the same are satisfactorily cleansed, and this usually requires, when ordinary soap powder is employed as the washing assistant, about 6 minutes.

Of course if it is desired to merely wash pans which are inverted on the lower basket, or to utilize only one of the particular series of sprays continuously instead of periodically, then the rod 62 is moved outward by gripping the knob 79 until the spokes of the sprocket 70 are withdrawn from the path of the rotating pin 71, and then the disc 58 is turned to uncover any one of the ports "b", "c", "d" which is desired in order to afford communication between the conduit controlled by such port and the pump via the pressure chamber 57.

When a washing operation is completed it is merely necessary in order to simultaneously rinse the dishes and discharge the water to swing the arms 75 and 78 into the position indicated by the extremity of the arcs shown in Fig. 3, and then if a flexible connection has been made between the arm 78 and the hot water supply, the hot water can be simultaneously admitted to the pressure chamber and from there discharged selectively through the various conduits supplying the different series of nozzles, while water discharged from the pump instead of being permitted to enter the pressure chamber will follow the line of least resistance and pass out through the discharge arm 75 which of course is adapted to project over the rim of a sink into which it will discharge its contents.

When it is desired to employ the pump to effect the rinsing of the dishes after the same have been washed it is important that the strainer basket be removed and emptied of its contents and returned to the sump, as otherwise the water circulated by the pump would be fouled by grease or other débris dissolved or removed from the strainer basket. Of course if the pump is employed for circulating the water through the spray nozzles during the rinsing operation, the arms 75 and 78 should be moved into their closed position, as indicated in the full lines in Fig. 3, before the motor is started, although obviously the rinse water may be introduced into the machine through arm 78 before starting the motor by swinging said arm into its outmost position to open the valve at the top of conduit 77.

Owing to the extremely fine high pressure sprays discharged upon the dishes it will be found that when the rinsing is completed the dishes will dry rapidly (in about 3 to 5 minutes) if allowed to either remain in the machine while the cover is raised into the position indicated by the dotted lines in Fig. 2, or by removing the baskets containing the dishes from the machine. While the dishes are drying the strainer can be emptied of its contents and replaced, but no other cleansing of the machine is required, since the sprays reach every portion of the machine and thereby maintain the same in a sanitary condition without necessitating any scrubbing thereof for this purpose.

The foregoing and other modifications may be made without departing from the spirit of the invention as embraced within the scope of the pending claims.

The term "cleansing water" as employed in the claims herein refers to water containing soap, washing powder or other detergent ingredient which is employed in the actual washing operation as distinguished from ordinary water such as is used for rinsing.

Having thus described our invention, what we claim and desire to secure by Letters Patent of the United States is:

1. In a dishwashing machine, the combination of a receptacle for containing the dishes to be washed and having a main cover through which the dishes can be removed, of a circulatory system including a pump, an intermediate chamber between said pump and said receptacle and in communication with the suction side of said pump and a series of spray nozzles in communication with said pump and located in the wall of said receptacle, means in said receptacle for supporting the dishes to be washed, a motor for operating said pump, a basket strainer positioned in said chamber intermediate the pump and the receptacle and having its bottom below the bottom of the receptacle, whereby water passing from said receptacle to the pump passes through said strainer and means independent of the main cover of the receptacle whereby without necessitating the removal of the dishes being washed, such strainer can be removed from said chamber.

2. In a dish washing machine, the combination comprising a circulatory system including a receptacle for receiving the dishes to be washed, a rotating dish carrier in said receptacle, a pump, means connecting the bottom of said receptacle to the suction side of said pump, spray nozzles discharging water into said receptacle and connected to the discharge side of said pump, a distributor chamber positioned intermediate said pump and said nozzles, an intermittently operating selective valve mechanism controlling the discharge of water from said distributor chamber to said nozzles, whereby the flow of water from said chamber to certain of said nozzles is maintained while a simultaneous flow of said water from such chamber to others of said nozzles is prevented, and means to continuously rotate said dish carrier and to intermittently operate said selective valve mechanism.

3. In a dishwashing machine, the combination comprising a circulatory system, including a receptacle for receiving the dishes to be washed, a pump, means connecting the bottom of said receptacle to the suction side of said pump, spraying means arranged in a plurality of groups for discharging water into said receptacle and connected to the discharge side of said pump and means for effecting the discharge from said pump of a volume of water under pressure corresponding to substantially the maximum capacity and pressure of such pump successively through the different groups and for maintaining such volume and pressure substantially throughout the period of operation of each group of spraying means.

4. A dish washing machine, comprising a receptacle for receiving dishes to be washed, a discharge chamber connected to said receptacle, a pump, the suction side of which is connected to such discharge chamber, a distributor chamber connected to the discharge end of said pump, a series of conduits each provided with spray nozzles at the discharge end thereof and having a single port at the intake end thereof, a selective valve comprising a slotted disc for successively uncovering during the rotation thereof the ports of different conduits, the slot in said disc being of less circumferential length than the distance between the ports of two successively positioned conduits, but which slot is of such length that the total area of a port or ports uncovered thereby during the rotation of the disc is substantially equal to the total area of any single port, a rod slidably connected to such disc and rotating therewith, a sprocket member at one end of said rod, a shaft carrying a projecting arm periodically engaging the teeth of such sprocket member during the rotation of said shaft, when said sprocket member is in operative position with respect thereto, a spring normally holding the faces of the valve on its seat, and means including a pointer and dial for removing said sprocket member from the path of rotation of said arm and thereby bringing any particularly desired port into communication with the slot in said valve.

5. In a dishwashing machine the combination comprising a circulatory system including a pump and a receptacle for containing dishes to be washed, said receptacle being provided with a plurality of apertures for discharging water thereinto, means for selectively and successively causing the discharge of water from the pump through different groups of such apertures and means for optionally maintaining the discharge of water through any particular group of apertures and for temporarily throwing the selective discharge mechanism out of operation.

6. In a dishwashing machine the combination comprising a receptacle for containing dishes to be washed, a main cover therefor through which the dishes can be removed, a pump, a supply conduit connecting such pump with said receptacle, a sump chamber interposed between said receptacle and said pump, means requiring the passage of all the water and accumulated débris in the dishwashing operation, from said receptacle through said sump chamber and to said pump, a removable basket strainer having foraminous side walls interposed in said sump chamber with its bottom below the bottom of the receptacle whereby said strainer can be removed from the sump chamber independent of the main cover of the machine, said strainer being of such dimensions that the cross-sectional areas of the same throughout substantially its entire distance below the top thereof are considerably less than the corresponding cross-sections of the sump chamber.

7. The method of washing dishes, which comprises discharging water under pressure upon a batch of dishes as a plurality of groups of streams discharging into different zones with respect to the vertical, the respective discharge of the groups of streams into the different respective zones being established and maintained in orderly succession and the pressure of the water in each of such groups of streams being substantially uniform during the principal portion of the period that such groups of streams are maintained, and the individual streams of a group in at least one of said zones discharging at a plurality of different levels.

8. The method of washing dishes, which comprises discharging water under pressure upon a batch of dishes as a plurality of groups of whirling conical sprays the different groups discharging into different zones with respect to the vertical, the discharge of the groups of whirling conical sprays in the different respective zones being established and maintained in orderly succession, and the individual whirling conical sprays of a group in at least one of said zones discharging at a plurality of different levels.

9. The method of washing dishes which comprises discharging water under pressure as a group of sprays upon a batch of dishes, maintaining the pressure of the water substantially uniform during the principal portion of the period of discharge, then quickly shifting the flow of water so that the same is discharged in orderly succession as other groups of sprays and maintaining the pressure of the water in each of these latter groups substantially uniform during the principal portion of the period of discharge, and advancing the batch of dishes toward one of said groups of sprays and counter to the flow of water being so discharged.

10. The method of washing dishes which comprises discharging a volume of water in orderly succession as different groups of sprays upon a batch of dishes, maintaining substantially uniform pressure on the water throughout substantially the principal portion of the period of discharge as one group of sprays and, during the period of shifting of the circulation from one group to another, preventing the abrupt shutting off of the water discharging as one group of sprays until substantial flow of the water has commenced as another group of sprays, and continuously rotatating the batch of dishes toward and passing certain of said sprays while the same are operating and counter to the flow of the water of such sprays.

11. The method of washing dishes which comprises discharging a volume of water under pressure as a group of whirling conical sprays upon a batch of dishes, then discharging the water in orderly rotation as different groups of such sprays and presenting said batch of dishes successively to the different groups of said sprays.

12. The method of washing dishes which comprises discharging water under pressure as a group of sprays upon a batch of dishes, maintaining the group of sprays until at least substantially all the dishes of the batch have been continuously subjected a plurality of times to the complete action thereof, and then effecting the abrupt shifting of the flow of water so that the same is discharged as another group of sprays.

13. In a dishwasher, the combination comprising a circulatory system including a plurality of groups of spraying means adapted to discharge water upon utensils to be washed, means for supplying water under high pressure to the circulatory system, means for maintaining the full flow of water through certain of said groups of spraying means in orderly succession while preventing its flow through the rest of such groups of spraying means and means for by-passing the water during the transition period of shifting the discharge of water from one group of spraying means to another so as to prevent the accumulation of excessive pressure in the system at the moment of interruption of the discharge from one such group of spraying means.

14. In a dishwasher, the combination comprising a water circulatory system, including a pump, a plurality of spraying nozzles, the total outlet area of said nozzles being in excess of the capacity of the pump and means for automatically opening up communication between said pump and successive groups of said nozzles to maintain the effective operating pressure of the sprays therefrom, and means for relieving the said system from excessive pressure during the transition period when shifting communication with the pump from one group of nozzles to another.

15. The method of washing dishes which comprises discharging water under pressure as a group of sprays upon a batch of dishes, maintaining the pressure of the water substantially uniform during the principal portion of the period of discharge, then quickly shifting the flow of water so that the same is discharged in orderly succession as other groups of sprays and maintaining the pressure of the water in each of these latter groups substantially uniform during the principal portion of the period of discharge, and advancing the batch of dishes toward one of said groups of sprays and counter to the flow of water being so discharged.

16. The method of washing dishes which comprises discharging a volume of water in orderly succession as different groups of sprays upon a batch of dishes, maintaining substantially uniform pressure on the water throughout substantially the principal portion of the period of discharge as one group of sprays and, during the period of shifting of the circulation from one group to another, preventing the abrupt cutting off of the water discharging as one group of sprays until substantial flow of the water has commenced as another group of sprays.

17. The method of washing dishes which comprises discharging a volume of water in orderly succession as different groups of sprays upon a bath of dishes, maintaining substantially uniform pressure on the water throughout substantially the principal portion of the period of discharge as one group of sprays and, during the period of shifting of the circulation from one group to another, preventing the abrupt cutting off of the water discharging as one group of sprays until substantial flow of the water has commenced as another group of sprays, and continuously rotating the batch of dishes toward and passing certain of said sprays while the same are operating and counter to the flow of the water of such sprays.

18. The method of washing dishes which comprises discharging a volume of water under pressure as a group of whirling conical sprays upon a batch of dishes, then discharging the water in orderly rotation as different groups of such sprays and presenting said batch of dishes successively to the different groups of said sprays.

19. The method of washing dishes which comprises discharging water under pressure as a group of sprays upon a continuously moving batch of dishes, maintaining the group of sprays until at least substantially all the dishes of the batch have been presented a plurality of times to the complete action thereof, and then effecting the quick shifting of the flow of water so that the same is discharged as another group of sprays upon the same batch of continuously moving dishes.

Signed at New York, in the county and State of New York this 3rd day of July, 1924.

JOHN H. STRINGHAM.
EDGEWORTH GREENE.
WAITSTILL H. SWENARTON.